Oct. 14, 1969  R. R. CORDELL  3,472,079
AUTOMATIC SAMPLING SYSTEM
Filed May 13, 1968
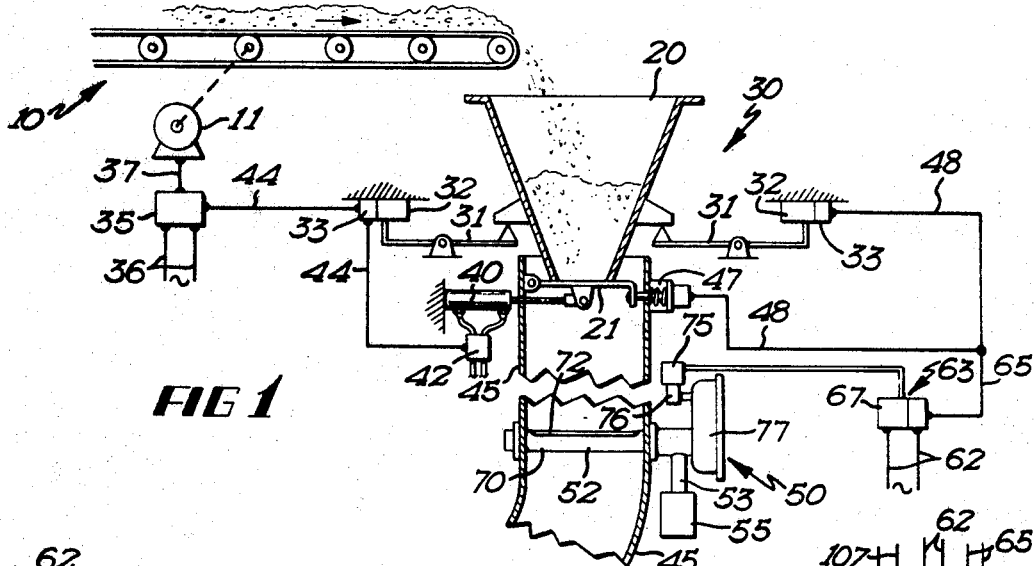
FIG 1
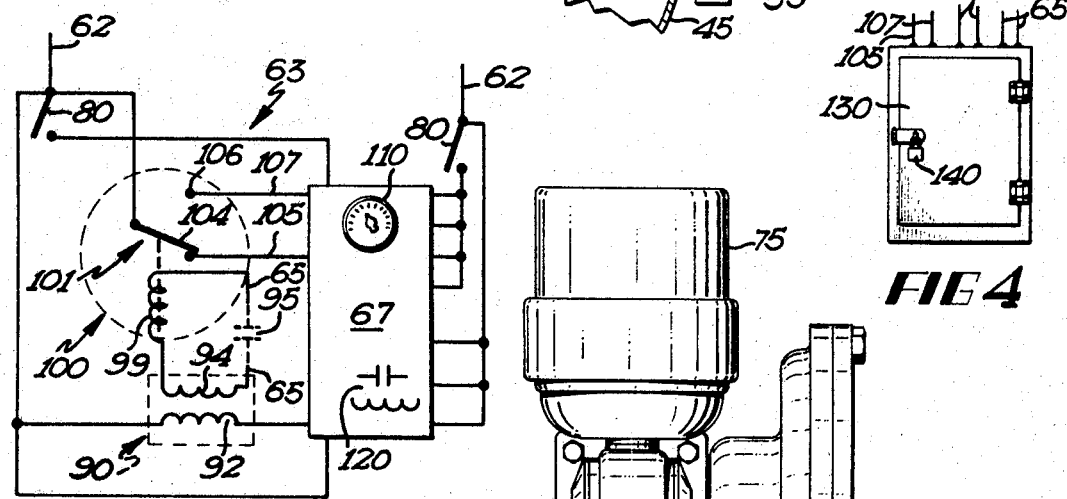
FIG 3
FIG 2
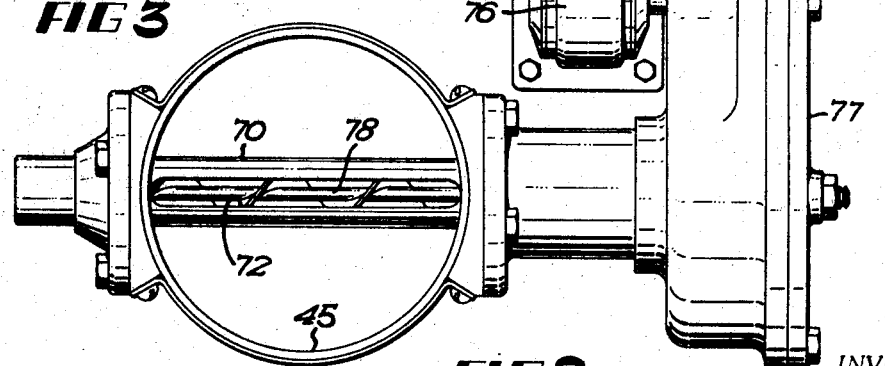
FIG 4
INVENTOR.
RAY R. CORDELL
BY
Schroeder, Siegfried
& Ryan
ATTORNEYS

United States Patent Office 3,472,079
Patented Oct. 14, 1969

3,472,079
AUTOMATIC SAMPLING SYSTEM
Ray R. Cordell, Hopkins, Minn., assignor to Gustafson Manufacturing Company, Hopkins, Minn., a corporation of Minnesota
Filed May 13, 1968, Ser. No. 728,388
Int. Cl. G01n 1/00
U.S. Cl. 73—424                                10 Claims

ABSTRACT OF THE DISCLOSURE

An automatic sampling system for use with bulk material handling of granular material in which pre-determined amounts of the material are measured and dispensed to a conduit in which a sampling device is located for sampling purposes. The measuring apparatus provides a signal upon reaching a pre-determined measurement to energize the sampling device through a suitable time delay mechanism to insure sampling at the same portion of each amount of the material measured.

---

My invention relates to sampling systems, and more particularly, to an improved automatic sampling system adapted to sample granular material delivered in batch form.

Sampling apparatus and sampling systems for granular materials and other fluent materials are well recognized and used. The present invention is directed to an automatic sampling system particularly adapted for use in connection with taking of samples delivered in batch form at random periods with accuracy in sampling. In apparatus of this type, the granular material is delivered in bulk form to a receiver wherein a pre-determined amount of material is measured and thereafter a sample is taken from the same. The delivery to the receiver is sporadic and sample taking, if attempted on an automatic basis, is inaccurate. In the present invention, the operation of the sampling equipment is slaved to the measurement of a batch and delayed a pre-determined period following the receipt of a batch and the dumping of the same to insure that sampling will take place with respect to consecutive batches at the same time and over the same period. This enhances accuracy of the sampling process, eliminates manual error and the possibility of tampering with the sampling apparatus and permits the sealing of the sampling apparatus. In the present invention, the delivery to the receiver is halted after a pre-determined amount is placed in the same and the material in the receiver is released to flow through a conduit in which the sampling device is located. Operation of the sampling device is delayed until after a pre-determined period in which a portion of the material in the receiver will have passed the sampling device and the sample taking will be effected at the same time and over the same length of time with respect to each batch. This eliminates the necessity of having the sampler continuously energized and/or manually operated and prevents tampering or altering of the sample taking period by unauthorized persons.

Therefore, it is the principal object of this invention to provide an improved automatic sampling system.

Another object of this invention is to provide an automatic sampling system of the batch type in which sampling is controlled in accord with a measuring apparatus which determines a batch.

Another object of this invention is to provide an improved automatic sampling apparatus which may be sealed against tampering and will insure accuracy in the sampling function.

These and other objects of this invention will become apparent from the reading of the attached description, together with the drawings wherein:

FIGURE 1 is a schematic view of the improved automatic sampling system,

FIGURE 2 is a plan view of a sampling device used in the same, with parts broken away, FIGURE 3 is a schematic circuit diagram of a sampling device, and FIGURE 4 is a schematic view of a control cabinet housing the control circuit of the sampling system.

My improved automatic sampling system is shown schematically in FIGURE 1 as a structure adapted to receive granular or fluent material in batch or pre-determined quantity, to measure the quantity, and release the material for flow through a conduit to a place of usage or storage. A sample is taken from the given quantity of material upon release of the same through the conduit and at a pre-determined time after release to produce a sample quantity which may be checked or evaluated for quality purposes. The delivery of a pre-determined amount to the batch receiver occurs at random periods or non-uniformly such that it is not practical or accurate to cycle the associated sampling device in the conduit to obtain an accurate check of the material flowing through the conduit lines. Thus, in FIGURE 1, a conveying apparatus is schematically disclosed at 10 as having an appropriate drive motor 11 driving the same. Only a fragmentary showing of the conveyor is included and it will be understood that this will be associated with some type of stock pile or dumping reservoir for the material in bulk form. Such material may be grains or other fluent material in granular form which it is desired to measure and check for quality. The output end of the conveyor is disposed over a batch receiving structure, or bin 20, such that the material on the conveyor will be dumped therein. The bin may take varying shapes or forms but will have an accessible inlet for the conveying apparatus and an exit door, such as is indicated schematically at 21, through which the granular material would be discharged after the measuring function. Associated with the bin structure is a scale, indicated generally at 30, as incorporating a suitable balance system 31 and a measuring or indicating apparatus 32, a signal generator 33, a portion of which would produce electrical signal or indication whenever a pre-determined condition of loading of the receiver is reached, and another signal when the receiver is empty. Such a batch receiving structure and associated scale is adapted to measure out quantities of the granular material to several hundred pounds, such as for example a 600 pound batch, which is then fed from the batch receiving structure through a conveying apparatus or pipe 45 to a place of usage (not shown). The latter may be storage bins or processing bins.

The signal generator 33 of the measuring apparatus 32 is connected through a controller 35 which is energized from an electrical source 36 to provide an appropriate energizing signal or source to the motor 11 through the conductors 37 to start and stop the conveyor. Thus, the conveyor will operate continuously until a batch or load was received at which point the conveyor will shut off. A similar signal, supplied through conductors 44, will operate through a controller 42 or valve to energize or operate the motive device 40 associated with the actuating mechanism for the exit door 21 of the batch receiver. The signal generator 33 will also apply an opposite control signal when the receiving structure is empty to provide an opposite condition of operation to the controller 42, causing the door to be closed whenever the material therein is exhausted and the scale or receiver showed an empty condition. A latch mechanism, indirected generally at 47 and controlled through a conductor 48 from generator 33, secures the door in a latched condition which is released by actuator 40.

The generator 33 of the scale is also connected through conductors 65 to a control circuit 63. Control circuit 63 is associated with a sampling device, indicated schematically at 50, which has a sample tube 52 positioned within the conduit 45 for the purpose of taking samples therefrom. The sampling device includes a sample passage 53 leading to a sample container 55. The control apparatus 63 is of the electrical type and is energized from a source through a pair of conductors 62 to control the opening of a sample tube 52 to allow the granular material to flow into the sampling device 50 and through the sample exit tube 53 to the sample container 55 during pre-determined periods of material flow through the conduit. This will be controlled by the timing mechanism of the controller 63 which will delay the opening or operation of the sample tube 52 in the pipe or conduit 45 until after the granular material leaving the batch receiver has traveled down the conduit a sufficient distance to be adjacent the sample tube 52. With this timing, the sample taking will occur at the same relative periods of flow of each batch of material in the conduit such that accurate samples or sampling would be provided. The entire sample structure, as will be later defined, will be locked or sealed such that it will rely on automatic operation from the weighing mechanism or the signal generator 33 associated therewith so that sample taking will be initiated only upon the presence of a pre-determined weight of the granular material within the batch receiver and the release of the same. A suitable time delay in initiation of operation of the sample device compensates for the length of conduit between the batch receiver and the sample tube location and is adjusted so that the sample taking will occur at an intermediate point of flow of the granular material past the sample tube for each batch. The length of time the sample tube is open is adjusted for the respective sampling device so that the size of the sample can be similarly adjusted. Whenever the scale mechanism reached a condition of balance which showed that there is no more granular material in the batch receiver, the exit door 21 is closed throughout operation of the motor 40 or motive means responding from the control signal of the controller 42 as initiated by the signal from the generator 33 of the scale mechanism. This same signal will operate through the conveyor 35 to re-energize the drive motor 11 of the conveyor to start the loading process over again.

FIGURE 2 shows a plan view of a sampling device which may be utilized with an improved automatic sampling system. This sampling device, indicated generally at 50 in FIGURE 1, may vary in form but normally includes a sample tube 70 extending through the conduit 45 with a sample opening 72 therein adapted to be opened and closed by the sampling device for permitting the entrance of a sample to the interior of the sample tube. This sampling device normally includes a motor 75 of the electrical type whose output shaft is coupled through a gearing, indicated generally by the gear housing 76, 77, to drive appropriate structures for opening and closing the sample opening 72 in the tube and to drive a suitable auger 78 therein for the purpose of moving the sample out of the tube and through the discharge of the sampling device to the conduit 53 and sample container 55. These structures may take varying forms, and hence the internal details of the sampling device are omitted for simplicity. Reference is made to the patent of Wayne F. Gustafson and R. R. Cordell, No. 3,217,546 dated Nov. 16, 1965 and entitled "Automatic Grain Sampling Device" as one example or embodiment of such structures. The control circuit for such a sampling device, such as is shown in block at 67 in FIGURE 1, is disclosed partially in FIGURE 3. The energizing conductors 62 are connected through disconnect switches 80 to the control circuit which includes an energizing transformer 90 having a primary winding 92 connected across the energizing conductors 62 and a secondary winding 94 connected in series circuit with a switching contact 95 indicated in phantom which is included in the generator 33 of the weighing mechanism and operative whenever a pre-determined weight is reached in the batch receiver 20. This secondary winding, as controlled by the contact 95, shown in phantom, will operate to energize the coil 99 of the time delay relay, indicated generally at 100, whose contact structure 101 is of the single pole, double pole type and connects the control circuit 67 of the sampling device to the source of power. Thus, as will be seen in FIGURE 3, relay 100 is a time delay relay and, upon closing, will have its normally closed contacts 104 connected through a conductor 105 to the control circuit shown in block diagram at 67. The normally open contact 106, which will be closed after a predetermined time delay upon energization of a time delay relay coil 99, is connected through a conductor 107 to the control circuit of the sampling device shown in block diagram at 67. This control circuit would include an interval timer, indicated generally within the block at 110, and other components such as time delay relays which would determine the length of time the sampling device would operate to take a sample. Similarly, such control circuits include one or more time delay relays, such as is indicated generally at 120, to time the periods in which the auger will be operated after sampling is completed to insure clean out of the sampling tube or equivalent structures. The Cordell Patent 3,217,546 referred to above is only one example of a variety of sampling devices and control circuits which will perform this general function. Since these details form no part of the present invention, they are omitted here for simplicity.

In my improved automatic sampling system, the control cabinet 130, as seen in FIGURE 4 or the enclosure for the control circuit, is provided with a lock mechanism 140 such that adjustments of the timer or exposure of the switches for initiating operation of the sampling device are protected against tampering. With the improved automatic control from the weighing mechanism, sampling will take place automatically after a pre-determined batch has been received by the batch receiving structure 20 and is discharged into the conduit or pipe which transmits the granular material to a place of usage or storage. This insures that the sampling device does not have to run continuously and thereby insures that sampling will take place at exactly the same period of time relative to the deposit of a batch into the conduit 45 to insure accurate sampling. In the handling of bulk materials, the conveying apparatus or the equivalent structures which load the batch receiving structure will receive material at random periods and, consequently, the loading of the batch receiver is not continuous but rather random in nature. The operation of the sampling system is made automatic by slaving the operation of the sampling device to the operation of the batch receiving structure, that is the discharge therefrom, so that bulk material may be measured, that is weighed, in batch lots and released to the transmission conduits at varying periods of time. The sampling device will operate only when a batch is received and released through operation of the signal generator device 33 associated with the weighing mechanism 32. This signaling device will prevent the entrance of additional material into the batch receiving structure by controlling the operation of the conveying apparatus as shown schematically in FIGURE 1 during such periods. Similarly, upon the deposit of all of the material within the batch receiving structure into the conduit, the scale mechanism will operate to close the exit door and initiate operation of loading through energization of the controlling or conveying apparatus. Suitable timing or timed delays is effected between the operation of the sampling device and the discharge of the granular material from the batch receiving structure to account for the distance in the conduit between the batch receiving structure and the sample tube of the sampling device. This time delay or timing function is adjustable through choice of or adjustment of the relay 100 to insure that a given period between the opening of the exit door and the operation of the sampling tube to condition the sample opening 78 to receive a sample. This will insure the taking of a sample at precisely the same period for each sampling sequence to insure accuracy in the sampling operation. The details of the sampling device per se and its control circuit are omitted here for simplicity since this portion of the structure may take varying forms. Such sampling devices will, after initiating, provide for sample opening into the conduit in which the material is flowing for the purpose of collecting a sample. Such sample opening will be opened for a pre-determined period of time determined by the timing function of the timer 120 within the control circuit and the sample opening or the tubes which collects the sample will be cleaned out through suitable means. In the case of an auger clean out, the auger will normally be operated for a period of time after the sample opening is closed, as described in the above-identified Patent 3,217,546 to insure clean out of the sample tube with each sequence of operation. This overall sampling system, including the sealed housing of the control apparatus for the sampling device, insures continuously and tamper-proof operation to provide for automatic sampling of a batch receiving structure which is loaded at random.

What is claimed is:

1. An automatic sampling system comprising, a bulk material batch receiving structure for granular material, said batch receiving structure having an inlet and an exit door to permit selective removal of the material from within said structure, apparatus associated with the bulk material batch receiving structure for loading said receiving structure including motive means for operating the same, conduit means connected in material receiving relationship with the batch receiving structure adjacent said exit door and adapted to transfer granular material therefrom to a pre-determined destination, a sampling device positioned downstream of the batch receiving structure and having a sample receiving portion positioned in the conduit means adapted to remove bulk material therefrom for said sampling purposes, said sampling structure having a timing mechanism associated therewith for controlling the operation of taking samples of granular material from the conduit means, means responsive to a pre-determined condition of loading of the batch receiving structure with granular material for producing an indication of a pre-determined condition of load, and supervisory control circuit for initiating and terminating operation of the sampling device, said supervisory control circuit being connected to said responsive means and operated from the indication of the responsive means of the batch receiving structure.

2. The automatic sampling system of claim 1 in which the apparatus for loading the batch receiving structure is a conveying apparatus and the exit door includes a motive means for opening and closing the same, and including additional circuit means connected to and operated by the supervisory control circuit in response to the indication of a pre-determined condition of loading for opening and closing the exit door and stopping the conveying apparatus.

3. The automatic sampling system of claim 2 in which said sampling device includes a control circuit means with a time delay means and re-cycling means therein whose operation is initiated by the supervisory control circuit.

4. The automatic sampling system of claim 3 in which the sampling device is a sealed unit with additional conduit means connected thereto for isolating and sealing samples taken therefrom.

5. The automatic sampling system of claim 4 in which the means responsive to a pre-determined condition of loading of the batch receiving structure is a weighing mechanism including an automatic switch-operated means operative to a circuit controlling condition for opening the exit door, stopping the conveying means, and energizing the sampling device whenever the batch receiving structure reaches a pre-determined weight of loading.

6. An automatic sampling system having a receiving structure adapted to receive granular material in bulk form through random deposits therein and a conduit structure associated therewith into which the granular material is dispensed from the receiving structure for transfer of the same to a remote point, the improvement residing in the combination of a means for sensing the presence of a pre-determined amount of granular material in the receiving structure and producing an indication in response thereto for providing evacuation of the granular material from the receiving structure to the conduit stucture, a sampling device adapted to be associated with the conduit structure and positioned in intercepting relationship with the flow of granular material therein, said sampling device having a control means for controlling the operation of the same, and circuit means coupling the sensing means to the control means of the sampling device to initiate operation of the same upon the presence of an indication from the sensing means.

7. The automatic sampling system of claim 6 in which the control means includes time delay means for delaying the operation of the sampling device following the presence of the indication of the sensing means a pre-determined period of time.

8. The automatic sampling system of claim 7 in which the sensing means includes means for permitting evacuation of the granular material from the receiving structure upon the presence of the indication from the sensing means.

9. The automatic sampling system of claim 8 in which the sensing means includes a scale and a controller operated thereby which provides a controlling signal as the indication of the presence of a pre-determined weight in the receiving structure.

10. The automatic sampling system of claim 9 in which the sampling device and control means are sealed to prevent manual initiation of the same.

References Cited

UNITED STATES PATENTS

| | | | |
|---|---|---|---|
| 2,995,931 | 8/1961 | Perry et al. | 73—422 X |
| 3,156,120 | 11/1964 | Kowyhia | 73—421 |
| 3,279,259 | 10/1966 | Haley et al. | 73—421 |

S. CLEMENT SWISHER, Primary Examiner